United States Patent [19]
Jordan et al.

[11] 4,428,179
[45] Jan. 31, 1984

[54] CHICKEN WEIGHING APPARATUS

[75] Inventors: C. Wane Jordan; John W. Walker, both of Macon, Mo.

[73] Assignee: Banquet Foods Corporation, Macon, Mo.

[21] Appl. No.: 325,828

[22] Filed: Nov. 30, 1981

[51] Int. Cl.³ .................... G01G 19/04; B65B 57/00
[52] U.S. Cl. ...................................... 53/502; 53/154; 53/475; 53/501
[58] Field of Search ................. 53/502, 501, 155, 154, 53/473, 475; 177/25, 123, 122, 1; 209/595

[56] References Cited

U.S. PATENT DOCUMENTS

| | | | |
|---|---|---|---|
| 2,470,916 | 5/1949 | Carruthers | 209/595 |
| 2,802,658 | 8/1957 | Hensgen et al. | 265/27 |
| 3,073,399 | 1/1963 | Durand | 177/53 |
| 3,260,317 | 11/1971 | Henry | 177/54 |
| 3,311,182 | 3/1967 | Rusnack et al. | 177/45 |
| 3,416,619 | 12/1968 | McClusky | 177/53 |
| 3,416,620 | 12/1968 | McClusky | 177/123 |
| 3,708,025 | 1/1973 | Soler et al. | 177/1 |
| 3,714,401 | 1/1973 | Yano | 235/151.33 |
| 3,939,928 | 2/1976 | Murakami et al. | 177/25 |
| 3,945,448 | 3/1976 | Sellers | 177/25 |
| 3,959,636 | 5/1976 | Johnson et al. | 235/151.33 |
| 3,977,483 | 8/1976 | Greanias | 177/1 |
| 4,065,911 | 1/1978 | Fagan | 53/53 |
| 4,123,970 | 11/1978 | Quante | 100/45 |
| 4,206,822 | 6/1980 | Mazzuchelli | 177/25 |

OTHER PUBLICATIONS

"Heat and Control News", Nov. 1981.

Primary Examiner—James F. Coan
Attorney, Agent, or Firm—Willian, Brinks, Olds, Hofer, Gilson & Lione Ltd.

[57] ABSTRACT

A device for filling a package with a predetermined weight of items, such as pieces of chicken, is disclosed. The device, under the control of a computer, determines which, of several pieces of chicken held in a plurality of holding means, should be added to a partially filled package in order to bring the contents of that package up to the predetermined weight.

10 Claims, 3 Drawing Figures

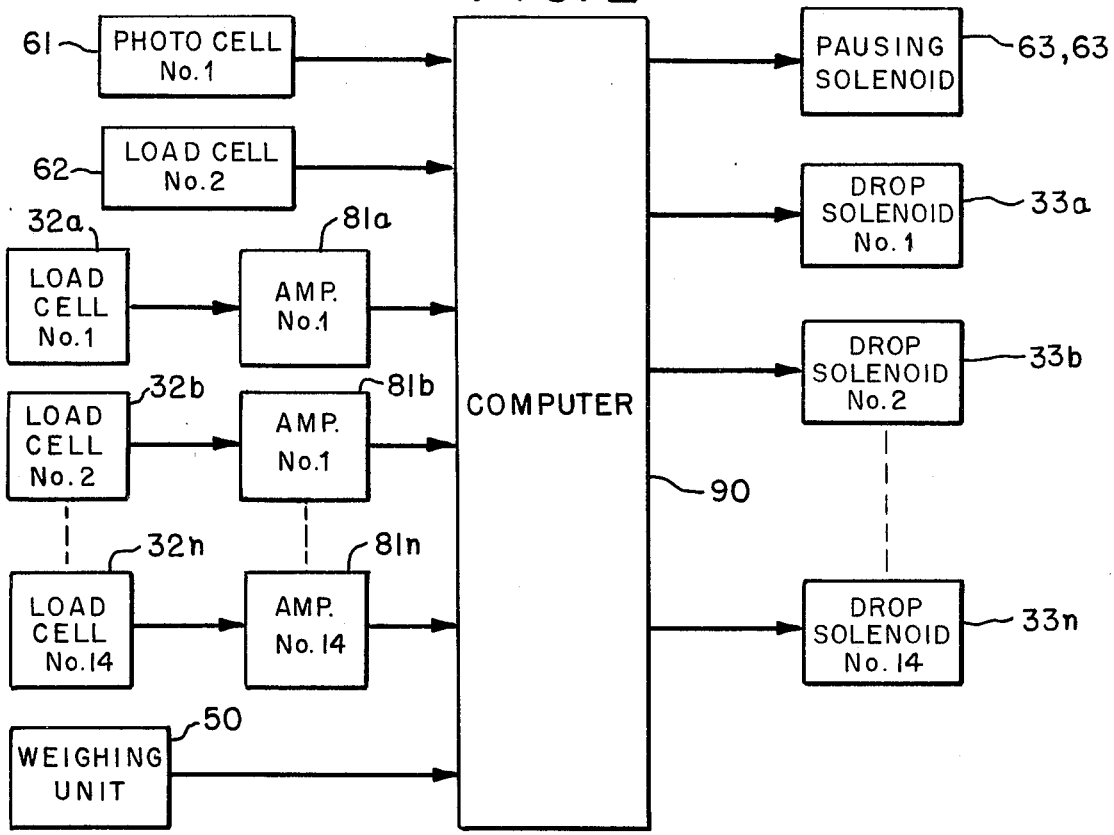
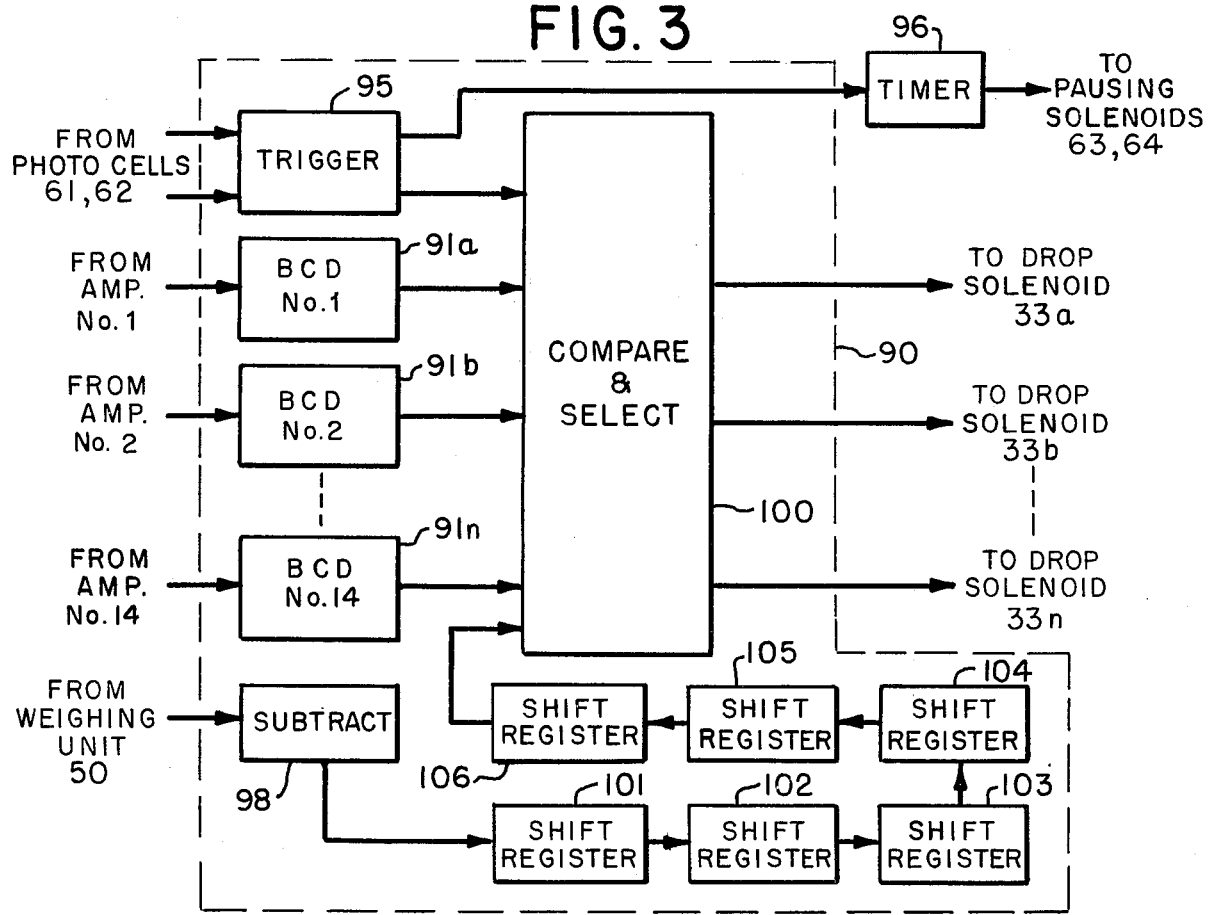

CHICKEN WEIGHING APPARATUS

BACKGROUND OF THE INVENTION

This invention relates to a device which is adapted to package predetermined weights of irregularly shaped, different-sized items such as pieces of chicken. Though many automatic or substantially automatic packaging devices are known in the art, it appears that most of them relate to apparatus which package items which are of substantially the same size, i.e., items which are of a fungible and/or particulate nature.

The task of packaging different-sized items, such as pieces of chicken, is considerably more difficult for many reasons. For example, unlike fungible, particulate items, pieces of chicken are not readily "poured" from hoppers or other containers. Moreover, pieces of chicken are not interchangeable, but may vary in weight from nine to 200 grams.

It is thus a primary object of this invention to provide an improved device which substantially automatically packages predetermined weights of irregularly shaped, different-sized items such as pieces of chicken. It is another object of the invention to provide an improved device which packages such items relatively quickly, efficiently and inexpensively. A further object of the invention is to provide an improved method for packaging predetermined weights of irregularly shaped, different-sized items.

SUMMARY OF THE INVENTION

The foregoing objects, along with numerous features and advantages of the invention, are achieved in a device for filling a package with a predetermined weight of irregularly shaped, different-sized items. The device includes first weighing means for passing to a computer information relating to the weight of a first quantity of items in the package. The weight of this first quantity of items is less than the predetermined weight, and thus the package is initially only partially filled. A plurality of holding means, each adapted to support one additional item for subsequent passage to the package upon receipt of a control signal from the computer, and second weighing means for passing to the computer information relating to the weight of the additional items supported by the holding means are also provided. The computer passes the control signal only to those holding means whose items, when combined with the first quantity of items in the package, most nearly equals the predetermined weight.

The foregoing objects, features and advantages of the invention may be further accomplished in a method for filling a package with a predetermined weight of irregularly shaped-different sized items. The method contemplates providing to a computer first weight information relating to the weight of a first quantity of the items in the package less than the predetermined weight. Second weight information relating to the weight of additional ones of the items initially held in a plurality of holding means is also provided to the computer. The method further contemplates selecting which of the holding means hold those additional items which, when combined with the first quantity of items, most nearly equals the predetermined weight, and transferring the additional items to the package on command from the computer.

BRIEF DESCRIPTION OF THE DRAWINGS

The invention summarized above can be best understood by reading the following detailed description in conjunction with the accompanying drawings in which:

FIG. 2 is a block diagram of the electronic circuitry which controls the invention exemplified in FIG. 1; and FIG. 3 is a more detailed block diagram of the electronic circuitry shown in FIG. 2.

DETAILED DESCRIPTION OF AN EXEMPLARY EMBODIMENT

Figure 1:
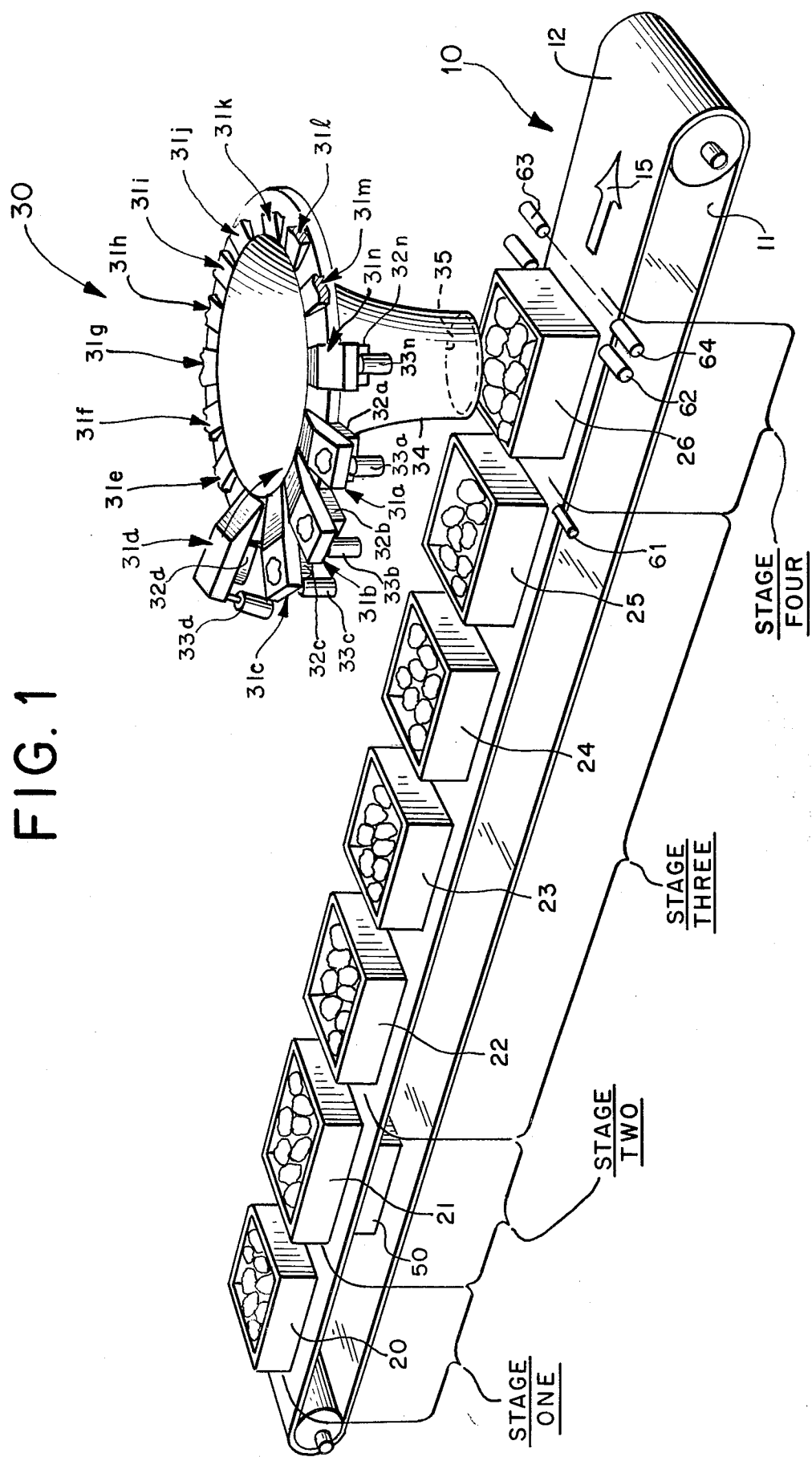
FIG. 1 is a perspective view of a portion of an exemplary embodiment of the invention in simplified schematic form.

Referring now to FIG. 1, a portion of an exemplary embodiment of a device for filling a package with a predetermined weight of irregularly shaped, different-sized items is represented generally by the reference numeral 10. The device 10 typically includes a conveyor 11 having an endless belt 12 driven by a power source (not shown). Endless belt 12 is adapted to carry a plurality of packages, represented in FIG. 1 by boxes 20–26, in the direction of the arrow 15. Thus, each box begins at Stage One, and progressively moves along the path defined by belt 12 through Stages Two, Three and Four.

As noted above, device 10 is adapted to fill packages, such as boxes 20–26, with irregularly shaped, different-sized items. For purposes of this exemplary embodiment, these items are identified as pieces of chicken. The invention, however, should not be so limited, but should be accorded a scope commensurate with the appended claims. Moreover, depending on the capacity of boxes 20–26, and the items with which they are to be filled, a "filled" box is defined as one which holds a predetermined weight of items. This predetermined weight may actually be a target weight, a predetermined range of weights, a predetermined minimum weight, etc. For example, in this exemplary embodiment, a predetermined weight of chicken is a target weight of 900 grams. Again, this should not be construed as limitative, the invention being defined by the appended claims.

In this exemplary embodiment, the target weight of 900 grams may be reached by packaging nine or ten pieces of chicken in each box. This is most expeditiously accomplished by initially putting eight pieces of chicken in each box, and then adding one or two additional pieces to bring the total weight up to the target weight. This process may be accomplished in the four Stages identified in FIG. 1.

As Stage One, eight pieces of chicken are put into a package, such as box 20. This may be done manually or automatically. The partially filled box 20 is then transferred by conveyor 11 to Stage Two.

At Stage Two the partially filled box—in this case box 21—is passed over weighing means in the form of a weighing unit 50. In this exemplary embodiment weighing unit 50 is an Icore Autochecker Checkweigher—Classifier 2000 Series, manufactured by the Icore Corporation of Mountain View, Calif. As explained in greater detail hereinafter, weighing unit 50 preferably determines the weight of the eight pieces of chicken previously placed in box 21, along with the weight of the box, and passes this weight information to computation means in the form of a computer 90 shown in block form in FIGS. 2 and 3. In this embodiment, computer 90 is an Allen-Bradley programmable controller of the type described in Allen-Bradley Bulletin 1774.

As partially filled boxes of chicken, such as boxes 22-25, leave weighing unit 50 and enter Stage Three, the computer 90 calculates the additional weight of chicken which must be added to each box in order to bring the net weight of chicken contained therein up to the predetermined or target weight. This typically requires the addition of one of two pieces of chicken. The boxes 22-25 leaving weighing unit 50 then proceed via belt 12 of conveyor 11 toward a dumper 30 at Stage Four. Just before reaching dumper 30, however, the last box at Stage Three—in this case box 25—passes sensing means in the form of a photo cell 61.

Photo cell 61 is positioned along belt 12 of conveyor 11 at a preset distance in advance of dumper 30—16 inches in this embodiment. When so positioned, photo cell 61 is adapted to apply an activating signal to computer 90 indicative of the proximity of box 25 to dumper 30. Photo cell 61 is preferably Model No. ML54A manufactured by the Micro Switch Division of Minneapolis Honeywell Corp. in Freeport, Ill.

Dumper 30, which is located above belt 12 of conveyor 11 at Stage Four, is comprised of a plurality of holding means 31a-31n. Though in this embodiment 14 such holding means are employed, any suitable number may be utilized. Associated with each of holding means 31a-31n is a second weighing means in the form of a load cell identified schematically by reference numerals 32a-32n. Load cells 32a-32n preferably provide means for weighing a single piece of chicken deposited and maintained at holding means 31a-31n.

Actuation means in the form of a drop solenoid identified schematically by reference numerals 33a-33n are operatively linked to corresponding holding means 31a-31n. Thus, when any of drop solenoids 33a-33n are operated (such as drop solenoid 33d for example) the associated holding means (such as holding means 31d) is raised permitting the piece of chicken then held and maintained by the holding means to slide into a funnel 34. The chicken then passes out an opening 35 of funnel 34 into a waiting box such as box 26. In this exemplary embodiment load cells 32a-32n are Lebow Weight Cells Model No. 3168, manufactured by the Lebow Company of Troy, Mich., and drop solenoids 33a-33n are Bimba Air Cylinders, manufactured by the Bimba Company of Monee, Ill.

In a manner explained in greater detail hereinafter, computer 90 determines which of holding means 31a-31n holds pieces of chicken which, when combined with the eight pieces already in a partially filled box, such as box 26, will bring the contents of that box up to the target weight of 900 grams. After computer 90 determines which ones (typically one or two) of holding means 31a-31n are to be selected, it causes a control signal to be applied to the one or two drop solenoids 33a-33n associated with the one or two selected holding means. This, in turn, causes a piece of chicken to be dumped from the load cell associated from the selected holding means into box 26 via funnel 34.

Second sensing means in the form of a second photo cells 62, substantially identical to photo cell 61, is located along belt 12 of conveyor 11 at Stage Four. Photo cell 62 causes a second activating signal to be passed to computer 90 which, in turn, causes activation of a pair of pausing solenoids 63, 64. Pausing solenoids 63, 64, which operate in substantially the same manner as drop solenoids 33a-33n, are located under dumper 30 at opposite sides of belt 12 of conveyor 11. Upon activation by computer 90, pausing solenoids 63, 64 hold box 26 aligned under opening 35 of funnel 34 until the one or two pieces of chicken are dropped from the selected holding means 31a-31n into box 26. Pausing solenoids 63, 64 then retract, permitting box 26, now filled with nine or ten pieces of chicken whose weight is substantially equal to the target weight of 900 grams, to continue moving along conveyor 11.

Referring now to FIGS. 2 and 3, the operation of device 10, particularly as it is controlled by computer 90, is explained in greater detail. As noted above, eight pieces of chicken are deposited in boxes, as they start moving along belt 12 of conveyor 11. When one of these boxes, such as box 21, reaches weighing unit 50, weight information is determined and passed to computer 90. More particularly, as shown in FIG. 3, the weight of box 21 plus the weight of the eight pieces of chicken initially deposited therein, is applied to a subtract unit 98 of computer 90. Subtract unit 98 subtracts the weight of box 21 from the weight information it receives from weighing unit 50, and applies the difference, in binary coded decimal form, to a shift register 101.

Shift register 101 is but one of six serially coupled shift registers identified by reference numerals 101-106, respectively. Shift register 106, the last in the series, is coupled to a compare and select unit 100. In accordance with well-known shift register operation, the weight information relating to a particular box moving along belt 12 is applied to shift register 101, and is immediately cycled through shift registers 102, 103, 104, 105 and 106, ultimately being stored in the latter. When weight information relating to a subsequent box is passed to computer 90 via weighing unit 50, that information is cycled through shift registers 101, 102, 103, 104 and 105, ultimately being stored in the latter because shift register 106 is still occupied. When the weight information in shift register 106 is cleared the weight information previously stored in shift register 105 advances to shift register 106. Since shift register 106 is not cleared until after an activating signal is applied to computer 90 from photo cell 61, the box corresponding to the weight information stored in shift register 106 will always be the box that is immediately downstream from photo cell 61. In FIG. 1 that box is box 25.

Simultaneously with the movement of boxes 20-26 along belt 12 of conveyor 11, single pieces of chicken are deposited and maintained in each of the 14 holding means 31a-31n that comprise dumper 30. Load cells 32a-32n of each of holding means 31a-31n have means for determining the weights of the single pieces of chicken held in the associated holding means, and for developing analog electrical signals corresponding to those weights. For example, a weight of five pounds may produce a signal of 0.002229 volts. As shown in FIG. 2, the analog electrical signals developed by load cells 32a-32n of holding means 31a-31n are passed to a plurality of analog amplifiers 81a-81n, respectively. Amplifiers 81a-81n, which in this exemplary embodiment amplify the analog electrical signals over 600 times, pass the amplified analog electrical signals to appropriate inputs at computer 90. As shown in FIG. 3, the amplified analog electrical signals from amplifiers 81a-81n are received at BCD units 91a-91n, respectively. BCD units 91a-91n convert the amplified electrical signals into binary coded decimal form and pass the weight information in that form to compare and select unit 100.

Compare and select unit 100 is also coupled to shift register 106, receiving therefrom a signal corresponding to the weight of the eight pieces of chicken in the box immediately downstream from photo cell 61—box 25 in FIG. 1. This weight, i.e., the weight of the chicken in partially filled box 25, is subtracted from the target weight by compare and select unit 100, yielding a difference weight. It should be apparent that this difference weight corresponds to the additional weight of chicken that must be put into box 25 to bring the weight of the chicken in that box up to the target weight.

The additional weight of chicken that must be added to box 25 to bring its contents up to the target weight is then compared with the weight of each of the 14 pieces deposited and maintained in holding means 31a–31n. Compare and select unit 100 selects which of holding means 31a–31n hold the one or two pieces of chicken which, when added to the partially filled box 25, will bring the contents of that box most nearly up to the target weight.

When box 25 reaches photo cell 61, the latter passes an activating signal to a trigger unit 95. Trigger unit 95, in turn, develops a control signal which is applied to compare and select unit 100. Upon receipt of the control signal, compare and select unit 100 applies a drop signal only to those of drop solenoids 33a–33n associated with the selected one or ones of holding means cells 31a–31n. Upon receipt of a drop signal, the appropriate ones of drop solenoids 33a–33n are activated, causing the individual piece of chicken previously deposited and maintained in the selected one or two holding means 31a–31n to drop through funnel 34 and out of opening 35. By that time, the box which caused photo cell 61 to pass the activating signal to trigger unit 95 has been moved by belt 12 of conveyor 11 until it is positioned directly under opening 35. This position is represented by the location of box 26 in FIG. 1.

The movement of belt 12 of conveyor 11 is timed so that a partially filled box of chicken reaches the position of box 26, just as the additional piece or pieces of chicken are dropped from the selected holding means 31a–31n through funnel 34. By that time the box positioned in the location of box 26 will have also passed a photo cell 62 which, in turn, will have developed a second activating signal applicable to trigger unit 95. Trigger unit 95 responds to this second activating signal by developing a pause signal which is passed, via a conventional timing circuit 96, to a pair of pausing solenoids 63, 64. When activated, pausing solenoids 63, 64 extend partially across belt 12 thereby blocking the path of box 26. Box 26 is therefore held in position under opening 35 of funnel 34 for a predetermined duration established by timing circuit 96 sufficient to ensure that the piece or pieces of chicken dropping through funnel 34 fall into the underlying box. When that predetermined duration expires, pausing solenoids 63, 64 retract, thereby permitting the box in the position of box 26 to continue moving along belt 12 of conveyor 11. In the meantime, new pieces of chicken will have been deposited into the selected holding means 31a–31n, replacing those that had just been dropped through funnel 34.

By the time pausing solenoids 63, 64 retract, and a completely filled box moves out from under funnel 34, shift register 106 will have been cleared, and the weight information of a trailing box will have been shifted into shift register 106. Compare and select unit 100 then selects which of holding means 31a–31n holds the pieces of chicken which should be dropped into the trailing box. When this trailing box passes photo cell 61, the drop solenoids associated with the newly selected one or ones of holding means 31a–31n are activated, causing one or two pieces of chicken to again drop through funnel 34, this time into the trailing box. By proper adjustment of the speed of belt 12, as many as 65 boxes can be accurately filled each minute.

What has been described is a novel device for filling a package with a predetermined weight of irregularly shaped, different-sized items such as pieces of chicken. Numerous modifications or refinements of this device, or the methods associated therewith, which do not part from the scope of the invention, may become apparent to those skilled in the art. All such modifications and refinements are intended to be covered by the appended claims.

I claim:

1. A device for filling a package with a predetermined weight of irregularly shaped, different sized items comprising:

computation means;

first weighing means for passing to said computation means information relating to the weight of a first quantity of items in said package, said weight of said first quantity of items being less than said predetermined weight;

a guide funnel having an upper rim and a lower opening;

a plurality of holding means, each adapted to support one additional item for subsequent passage to said package upon receipt of a control signal, said holding means disposed around the upper rim of the guide funnel such that each of the holding means is symmetrically placed with respect to the lower opening;

second weighing means for passing to said computation means information relating to the weight of the additional items adapted for passage to said package from each of said holding means;

said computation means passing a control signal only to a selected subset of said holding means whose items, when combined with said first quantity of items in said package, most nearly equals said predetermined weight, thereby causing the items of the selected subset of the holding means to travel through the funnel and out the lower opening.

2. The device defined in claim 1 further including sensing means for developing an activating signal, which initiates said control signal, when said package is at a predetermined position relative to said lower opening of said guide funnel.

3. The device defined in claim 2 further including second sensing means for developing a second activating signal when said package is at a second predetermined position aligned with said lower opening of said guide funnel; and pausing means, coupled to said second sensing means, for momentarily arresting said package in alignment with the lower opening in response to said second activating signal, in order to cause said package to pause while additional ones of said items are transferred to said package.

4. The device of claim 1 wherein said upper rim is circular in shape and wherein said holding means are disposed in a circle, aligned with said upper rim.

5. A device for filling a package with a predetermined weight of irregularly shaped, different sized items comprising:

conveyor means for moving said package along a path;

first weighing means, disposed along said path for developing first weight information relating to the weight of a first quantity of items in said package, said weight of said first quantity of items being less than said predetermined weight;

a plurality of holding means, each adapted to hold an additional one of said items, and each including second weighing means for developing second weight information relating to the weight of the respective additional ones of said items;

funnel means, coupled to said holding means, disposed above said path a predetermined distance from said first weighing means;

a plurality of actuation means, each associated with a corresponding one of said holding means, adapted to cause said associated holding means to pass the corresponding additional items held therein to said funnel means, upon receipt of a control signal;

computation means, adapted to receive said first and second weight information, for passing a control signal only to a selected subset of said actuation means associated with said holding means which hold selected additional ones of said items which, when combined with said first quantity of items in said package, most nearly equal said predetermined weight; and means for momentarily arresting movement of said package on the conveyor means when said package is aligned with the funnel means such that the package is caused to pause while said selected additional ones of said items are transferred to said package.

6. The device defined in claim 5 further including sensing means for developing an activating signal, which initiates said control signal when said package has moved a predetermined distance along said path.

7. The device defined in claim 5 wherein said funnel means defines an upper rim and a lower opening, and wherein said holding means are oriented around the upper rim, symmetrically with respect to the lower opening.

8. The device of claim 7 wherein said upper rim is circular in shape and wherein said holding means are disposed in a circle, aligned with said upper rim.

9. A method for filling a package with a predetermined weight of irregularly shaped, different sized items as the package is moved along a path, said method comprising the steps of:

(a) providing to computation means first weight information relating to the weight of a first quantity of items in said package less than said predetermined weight;

(b) providing to said computation means second weight information relating to the weight of additional ones of said items individually held in a plurality of holding means;

(c) selecting which of said holding means hold those additional ones of said items which, when combined with said first quantity of items, most nearly equals said predetermined weight;

(d) momentarily arresting movement of the package when the package reaches a predetermined position with respect to the holding means; and (e) transferring those of said additional ones of said items to said momentarily arrested package on command from said computation means.

10. A device for filling a package with a predetermined weight of chicken parts, said device comprising:

conveyor means for moving said package along a path, said package containing a first plurality of chicken parts having a weight less than the predetermined weight;

first weighing means, disposed along said path, for developing a first weight signal indicative of the weight of the first plurality of chicken parts;

a guide funnel having a circular upper rim and a lower opening, said funnel mounted over the conveyor means such that the package passes under the lower opening after the first weighing means develops the first weight signal;

a plurality of holding means for holding at least one additional chicken part, said holding means being arranged in a circular array over the upper rim such that each of the holding means is symmetrically disposed with respect to the lower opening;

a plurality of second weighing means for developing a plurality of second weight signals, each of said second holding means associated with a respective one of the holding means such that each of the second weight signals is indicative of the weight of the at least one chicken part held by the coresponding holding means;

a plurality of actuators, each associated with a corresponding one of the holding means, each of the actuators responsive to a respective control signal to cause the corresponding holding means to discharge the corresponding held chicken parts into the funnel;

means for developing a position signal when the package reaches a predetermined position, prior to the time the package passes under the lower opening;

computation means, responsive to the sensor signal, the first weight signal, and the plurality of second weight signals, for passing the control signal at a selected time, prior to the time the package passes under the lower opening, only to a selected subset of the actuators associated with the ones of the holding means which hold selected additional chicken parts which, when combined with said first plurality of chicken parts, most nearly equal said predetermined weight; and means for momentarily arresting the movement of the package along the conveyor means when the package is aligned under the lower opening of the funnel, such that the package is caused to pause while said selected additional chicken parts are transferred via the funnel into the package.

* * * * *